United States Patent
Keane et al.

(10) Patent No.: US 10,259,414 B2
(45) Date of Patent: Apr. 16, 2019

(54) ADJUSTABLE TRUCK FRAME SIDE GUARD ASSEMBLY

(71) Applicants: Adam Keane, Des Moines, WA (US); Travis Whitaker, Renton, WA (US)

(72) Inventors: Adam Keane, Des Moines, WA (US); Travis Whitaker, Renton, WA (US)

(73) Assignee: Allied Body Works, Inc., Seattle, WA (US)

( * ) Notice: Subject to any disclaimer, the term of this patent is extended or adjusted under 35 U.S.C. 154(b) by 0 days.

(21) Appl. No.: 15/257,789

(22) Filed: Sep. 6, 2016

(65) Prior Publication Data
US 2017/0129433 A1     May 11, 2017

Related U.S. Application Data

(60) Provisional application No. 62/214,661, filed on Sep. 4, 2015.

(51) Int. Cl.
*B60R 19/56*     (2006.01)

(52) U.S. Cl.
CPC .................. *B60R 19/565* (2013.01)

(58) Field of Classification Search
CPC .................................. B60R 19/565
USPC ........................................ 293/132
See application file for complete search history.

(56) References Cited

U.S. PATENT DOCUMENTS

| | | | |
|---|---|---|---|
| 7,407,204 B2* | 8/2008 | Eriksson | B60R 19/565 293/102 |
| 7,967,349 B2* | 6/2011 | Puppini | B60R 19/565 224/42.23 |
| 8,177,286 B2* | 5/2012 | Brown | B62D 25/168 280/851 |
| 8,979,172 B2* | 3/2015 | Reiman | B62D 35/001 296/180.4 |
| 9,463,759 B1* | 10/2016 | Kiefer | B60R 19/565 |
| 9,487,171 B2* | 11/2016 | Rogers | B60R 19/565 |
| 9,840,219 B2* | 12/2017 | Theethira Kushalappa | B60R 19/56 |
| 2008/0116702 A1* | 5/2008 | Enz | B60R 19/56 293/128 |
| 2010/0156122 A1* | 6/2010 | Saitou | B60R 19/56 293/132 |

(Continued)

OTHER PUBLICATIONS www.taklerusa.com (see Catalog file, pp. 14-41 regarding Side Guards).

*Primary Examiner* — Pinel E Romain
(74) *Attorney, Agent, or Firm* — Dean Craine; Marisa Whitaker

(57) ABSTRACT

An adjustable side guard assembly that fits into the void space formed on a truck that prevents other motor vehicles or objects from entering the void space. The assembly includes an elongated side plate attached to a rigid frame. The rigid frame has two support members that extend pivotally attached to two laterally extending horizontal members. The distal ends of the two horizontal members engage slots formed on the side plate enabling the side plate to be longitudinally adjusted inside the void space. The opposite ends of the two horizontal members are attached to two upper mounting brackets that are attached to the vehicle frame. A diagonal member may be attached at one end of the horizontal member and at an opposite end to a lower mounting bracket attached to the vehicle frame.

7 Claims, 9 Drawing Sheets

(56) References Cited

U.S. PATENT DOCUMENTS

2017/0036628 A1\* 2/2017 Nelson .................. B60R 19/565

\* cited by examiner

ADJUSTABLE TRUCK FRAME SIDE GUARD ASSEMBLY

This application is based on and claims the filing date benefit of U.S. provisional patent application (Application No. 62/214,661) filed on Sep. 4, 2015.

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to truck frame side guards that prevent smaller vehicles or objects from impacting the mid-section of the truck frame between the truck cab and the rear axle, and more particularly to side guard kits that include a side member that is adjustable to accommodate different truck frame designs.

2. Description of the Related Art

Many flatbed cargo trucks, semi-truck and trailers, and utility vans have large elevated void spaces located on opposite sides of their frames between the truck cab and the rear axle and under the truck bed. Some void spaces are relatively large, four feet or more in length, three to four feet in height and three to four feet in depth. Sometimes, various objects or structures, such as lights, hydraulic cable rack, and a spare tire, are mounted inside the void spaces.

In an accident, motor vehicles, bicyclists, and pedestrians sometimes enter the void spaces and struck by objects located under the truck bed or by the rear tires. More recently, cargo and utility truck operators have begun installing vertical side guards in the void areas to prevent motor vehicles, bicyclists, pedestrians from entering the void spaces.

When a company needs a fleet of cargo trucks or utility trucks, it usually purchases a fleet of base model trucks and vans from a truck manufacturer and then hires another company to install customized accessories, such as racks, bumpers, storage bins, and shelving for hauling the company's equipment or supplies. The types of trucks or vans and the objects or structures in the void spaces can alter the amount of free void space on each side of the truck or van. When a company requests that side guards be installed on the truck or van, the side guards must be customized and specifically designed to fit into the available void space.

What is needed is a side guard assembly that includes at least one standard size side guard designed to fit longitudinally inside a four foot void space formed on a truck or van that uses mounting brackets that can be easily mounted by an installer to the truck or van's frame that enables the side guard to be held at different elevations and at different lengths to optimally cover the void space.

SUMMARY OF THE INVENTION

These and other objects of the invention are met by an adjustable truck frame side guard assembly designed to be used on cargo trucks and utility vans to cover the lower side void space under the bed or trailer and between the truck cab and the rear wheel. The side guard assembly allows the installer to adjust the side plates along three axes (X, Y and Z) in the void space to accommodate different objects or structures located inside the void space and still optimally protect the void space.

The side guard assembly includes a vertically aligned, planar side member with a lightweight inner frame covered by at least one rigid side plate. Attached to the inner frame are two upward extending support angle members. The upper end of each angle member is pivotally attached to the distal end of horizontal member that extends laterally from the vehicle frame and under the truck bed. Each angle arm includes at least two threaded connectors that slide along slots formed on the inner frame that enable the side plate to move forward or backward relative to the vehicle's frame.

Pivotally attached to the proximal end of each horizontal member is an upper inside mounting bracket that attaches to the outside surface of the vehicle frame. Attached to the vehicle frame and below the upper mounting bracket is a second inside lower mounting bracket. Pivotally attached to the inside lower bracket is a diagonal member that extends upward and attaches to a slide bracket attached to the horizontal member. The slide bracket is configured to slide along the horizontal member and selectively locked into a fixed position. By moving the slide bracket to different positions on the horizontal member, the distal end of the horizontal member may be selectively raised or lowered to raise and lower the side member inside the void space.

When installing the side member on a truck or van, the two pairs of upper and lower inside mounting brackets are attached to the outside surface of the vehicle frame. The two brackets are spaced apart a sufficient distance so the upper extending support members when attached to the inner frame may support the side member. The two horizontal and diagonal members are then attached to their respective, inside mounting brackets and extended outward. The intermediate slide brackets may be selectively moved longitudinally inward or outward over the horizontal members to raise or lower the side members. The threaded connectors used to attach the support members to the inner frame are loosened to allow the side member to move forward or rearward inside the void space. The threaded connectors are then tightened.

DESCRIPTION OF THE PREFERRED EMBODIMENT(S)

Figure 1:
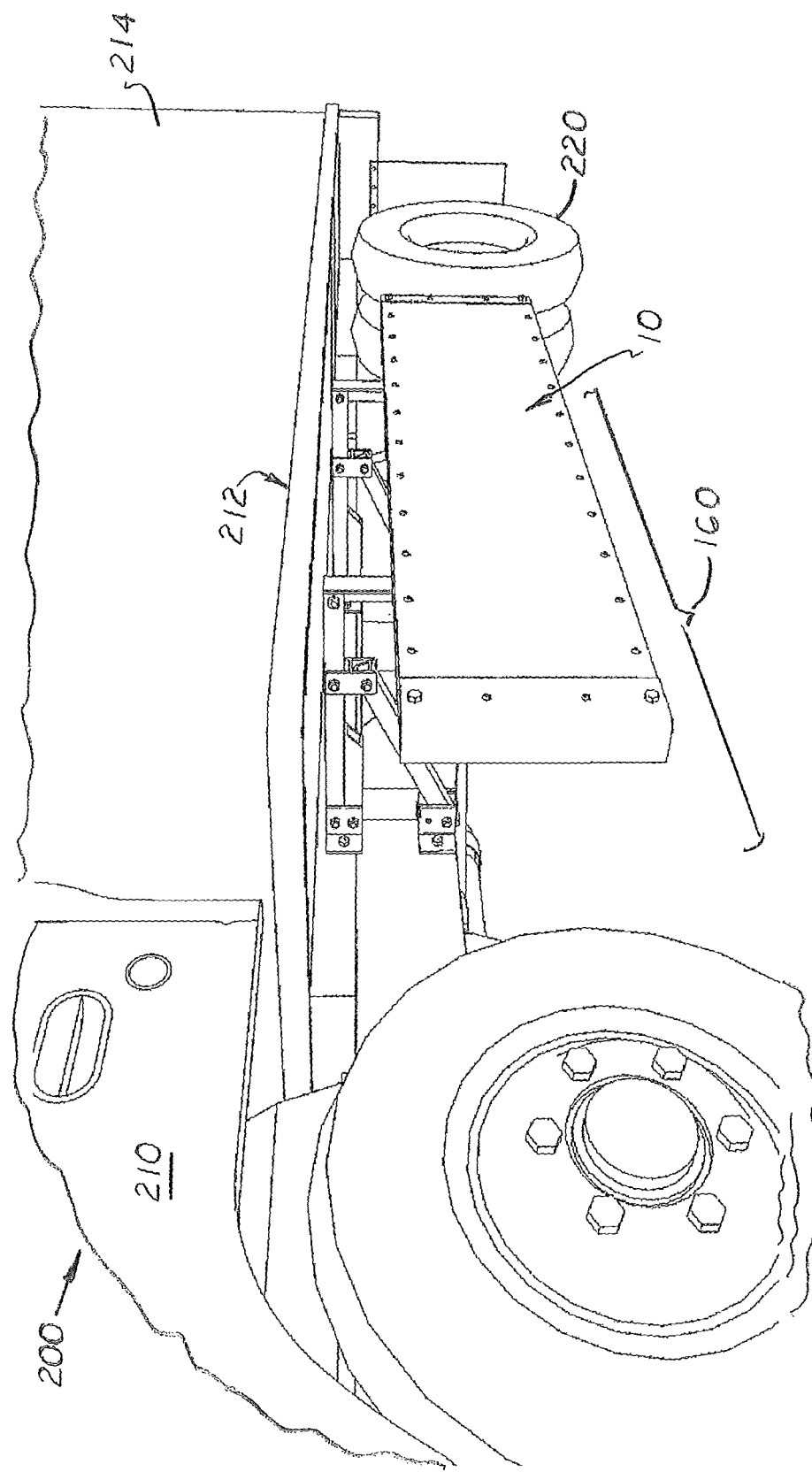
FIG. 1 is a perspective view of a cargo truck with the side guard assembly located inside the void space adjacent to the frame and in front of the rear tire.
Figure 2:
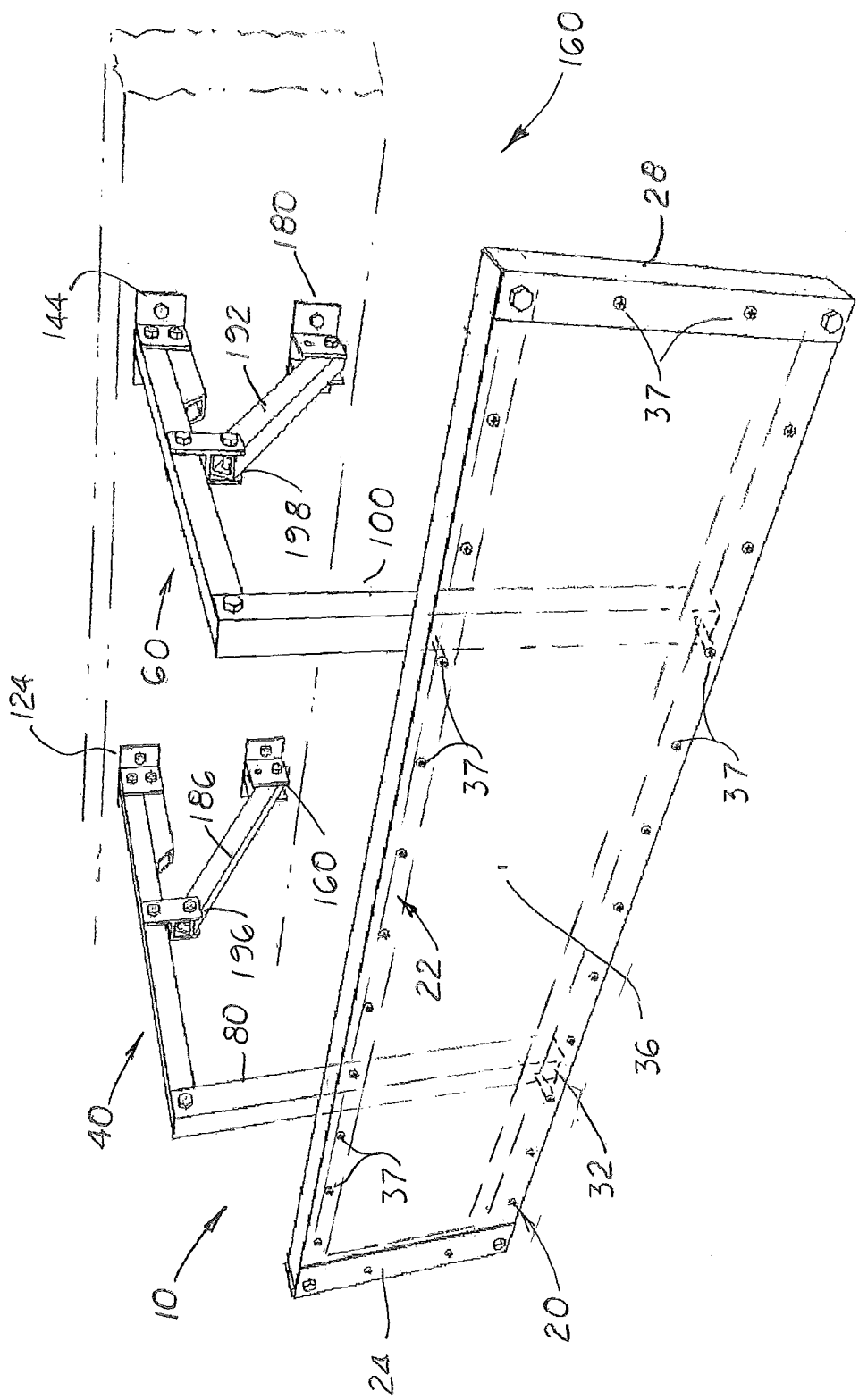
FIG. 2 is a side perspective of the side guard assembly.

Shown in the accompanying Figs is an adjustable truck frame side guard assembly 10 designed to be used on cargo trucks and utility vans (generally indicated by reference number 200) to cover the lower side void space 160 located under the bed 212 or trailer 214 and behind the truck cab 210 and the rear wheel 220 on the truck or trailer.

Figure 3:
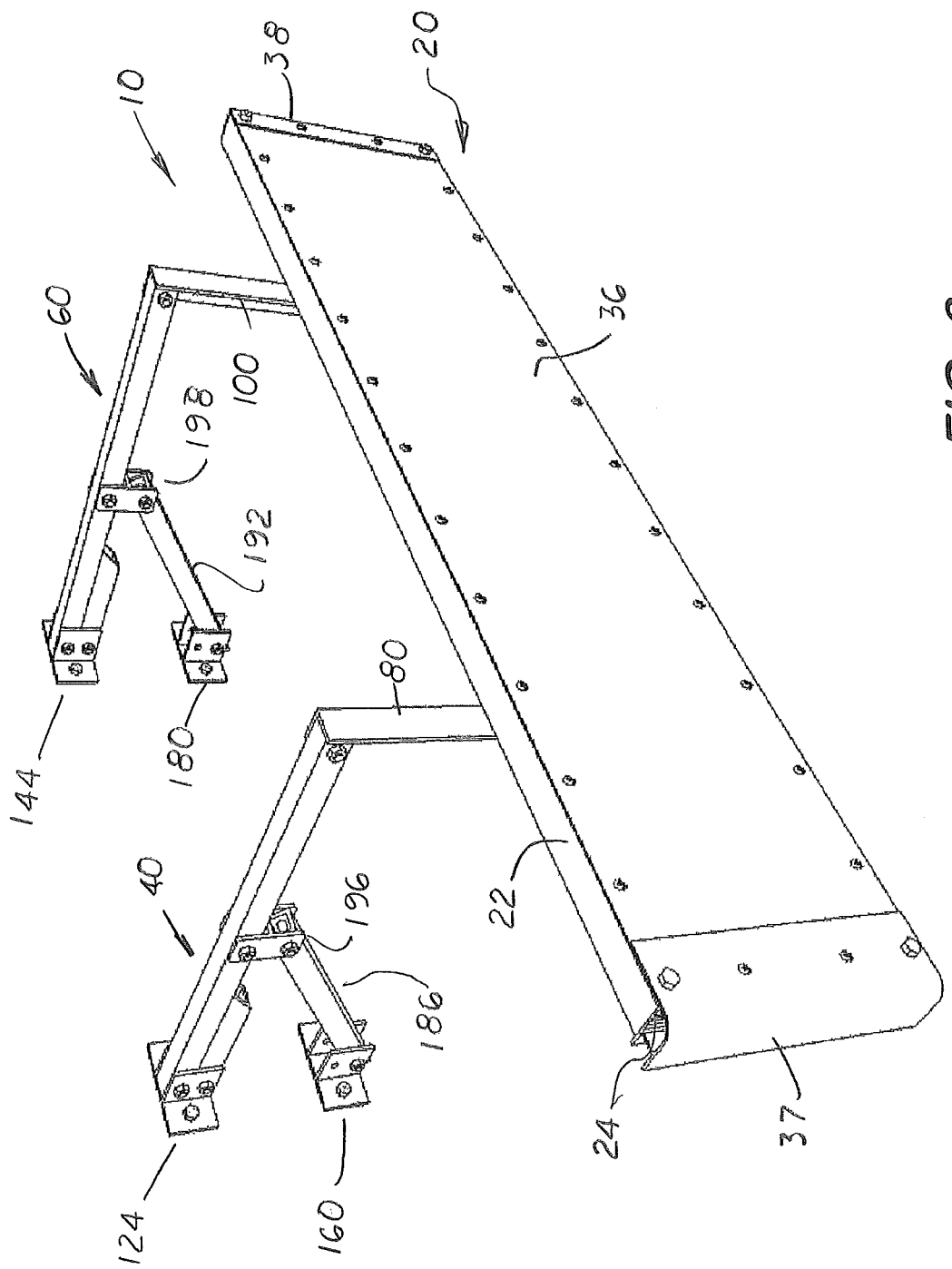
FIG. 3 is a front perspective view of the side guard assembly.
Figure 4:
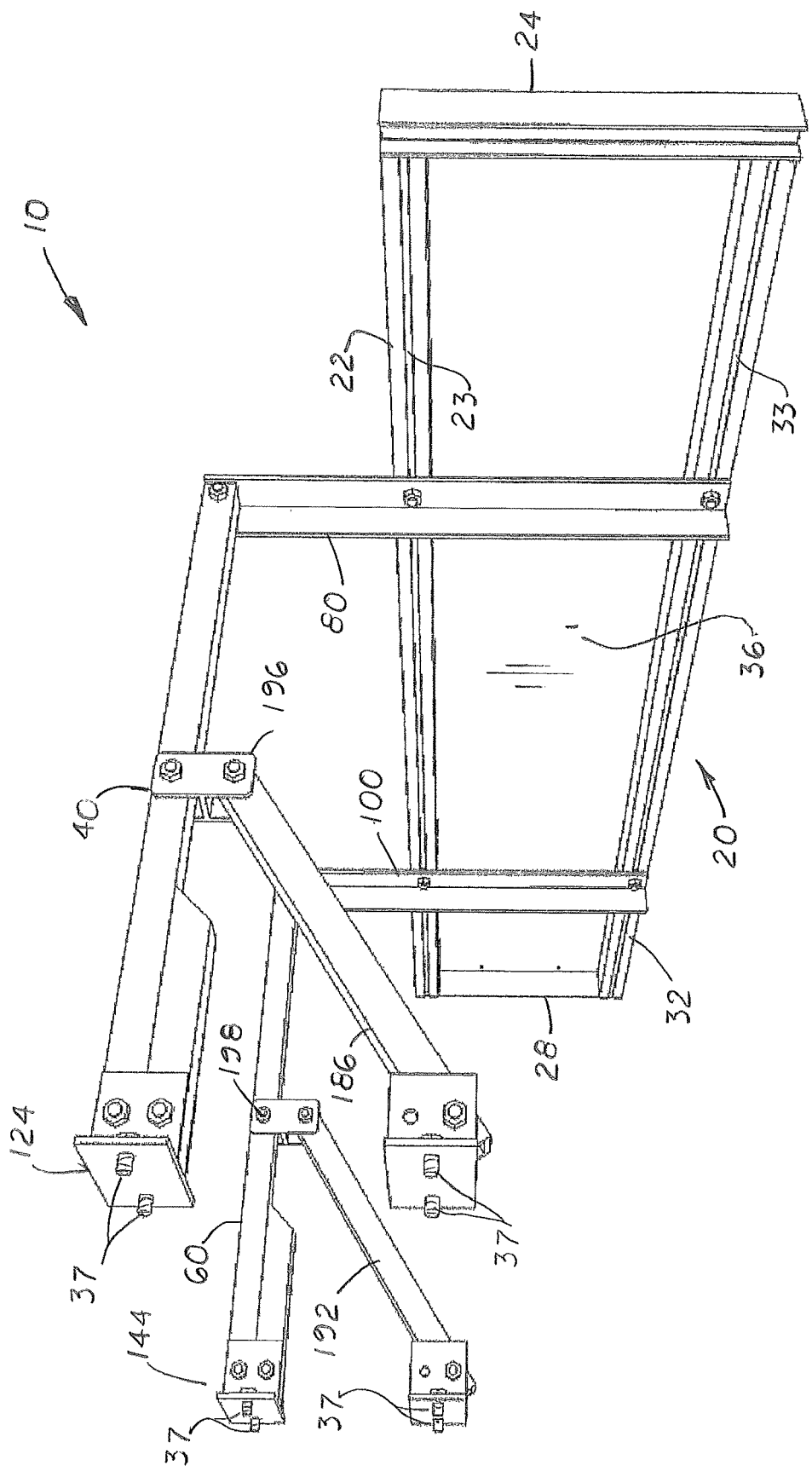
FIG. 4 is a rear perspective view of the side guard assembly.

The side guard assembly 10 includes a vertically aligned, planar side member 20 with a lightweight square or rectangular inner frame 22 covered by one or more rigid side plates 36. The inner frame 22 includes two longitudinally aligned tube members 22, 32, and two transversely aligned end angle members 24, 28. Formed on the inside surface of each tube member 22, 32 is a longitudinally aligned slot 23, 33, respectively, as shown in FIG. 4. A side plate 36 is attached to the outside surfaces of the tube members 22, 32 and the two end angle members, 24, 28 via threaded connectors 37. As shown in FIGS. 1 and 3, optional end covers 37, 38, may be attached to each end angle member 24, 28, respectively.

Figure 5:
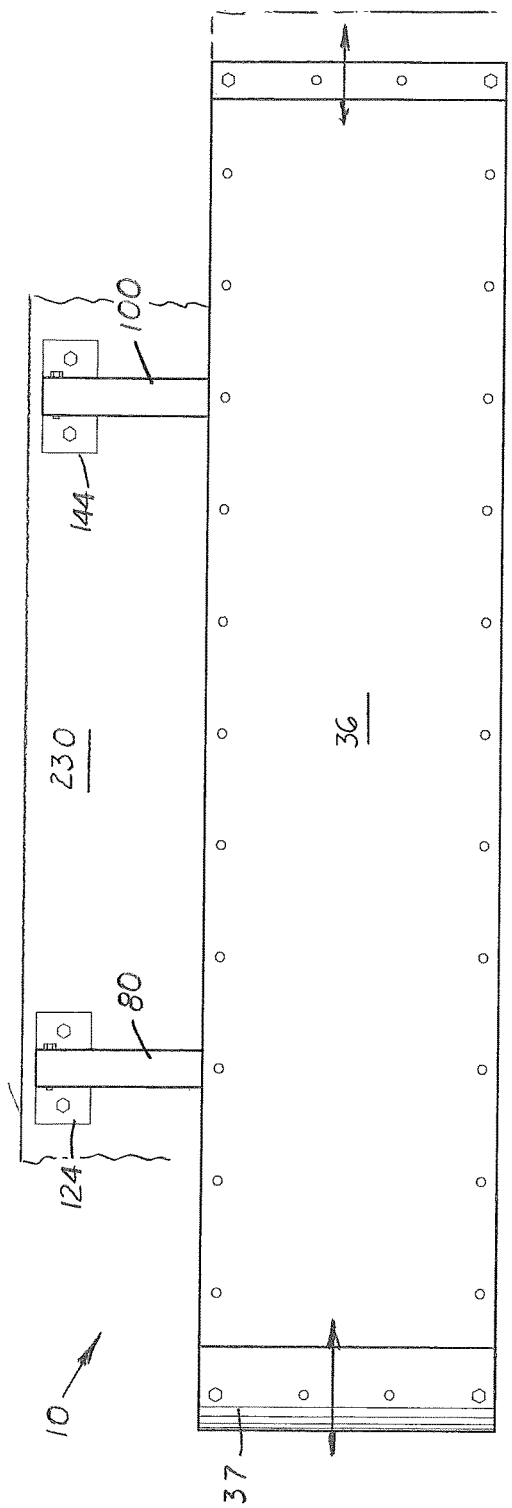
FIG. 5 is a front elevational view of the side guard assembly.
Figure 6:
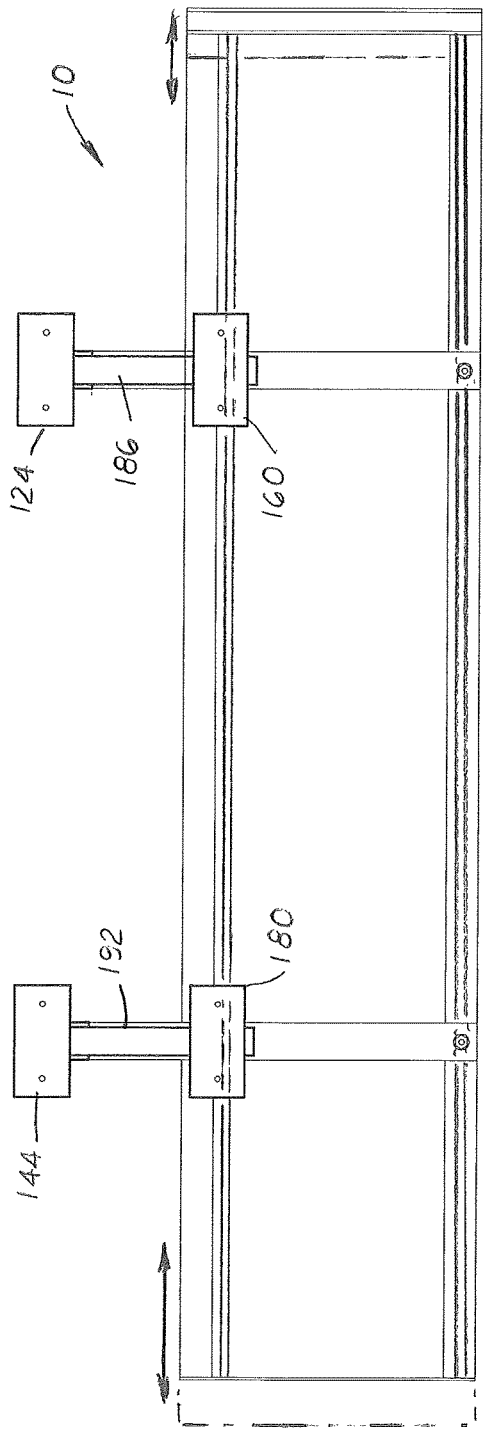
FIG. 6 is a rear elevational view of the side guard assembly.
Figure 7:
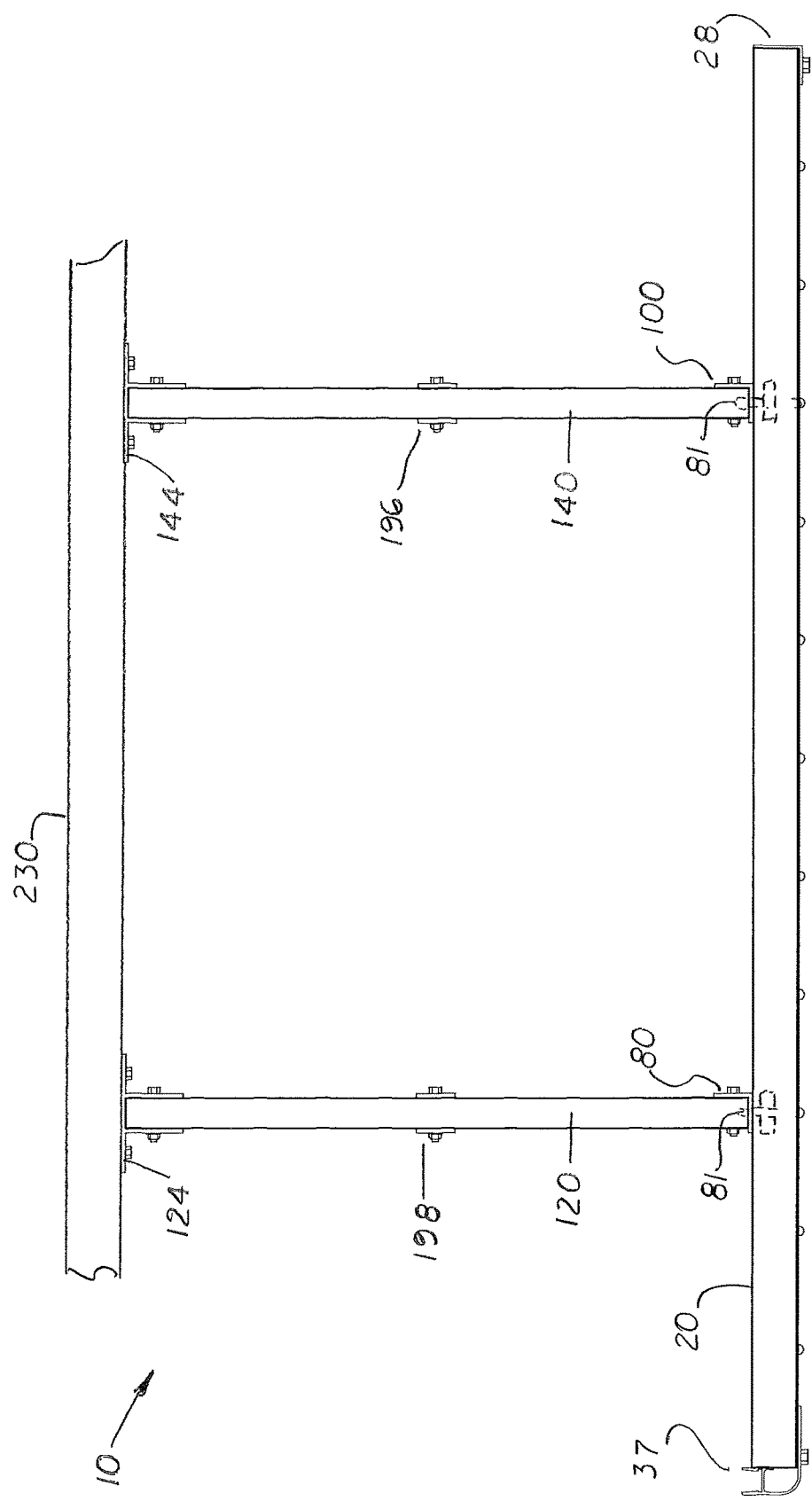
FIG. 7 is a top plan view of the side guard assembly.
Figure 8:
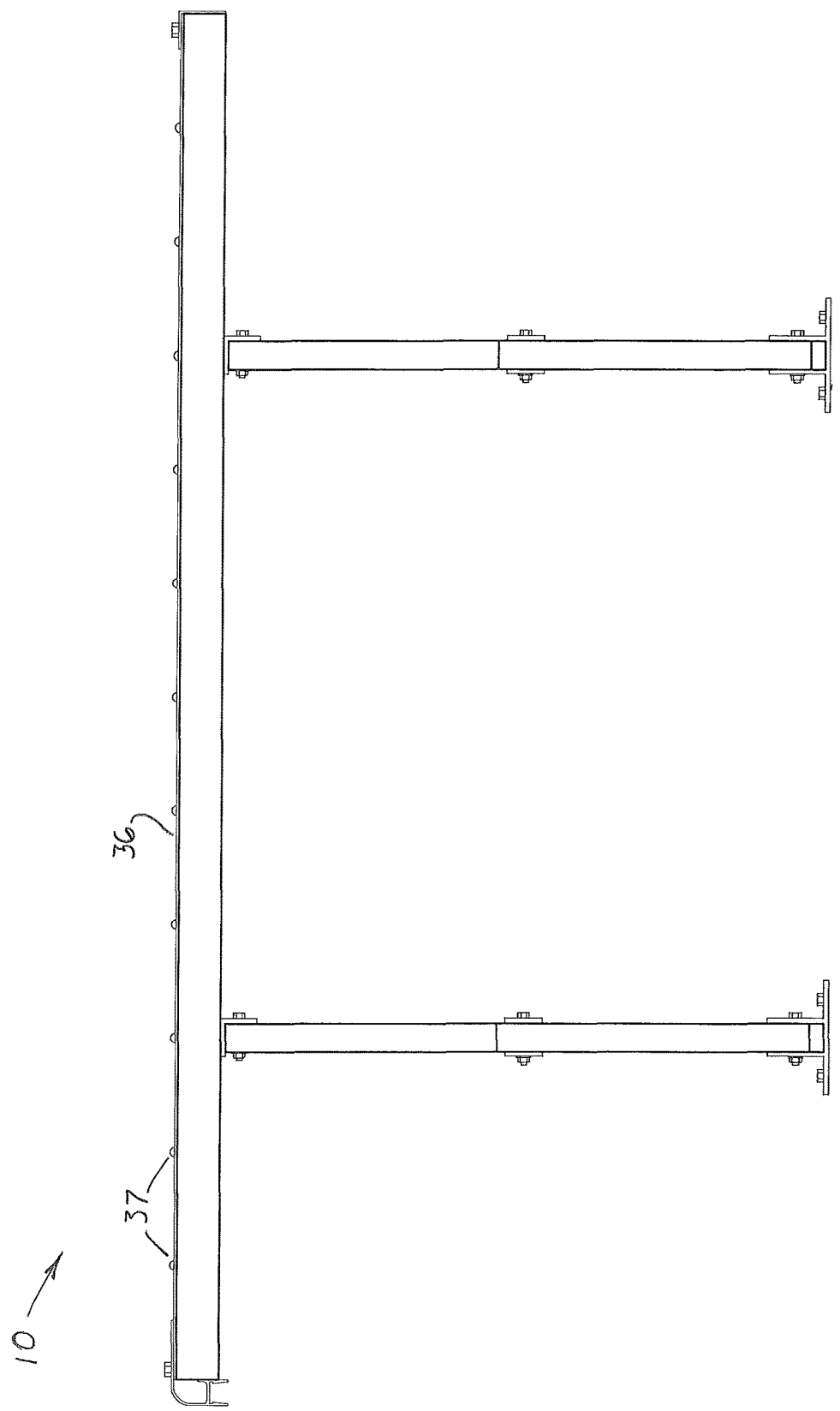
FIG. 8 is a bottom plan view of the side guard assembly.
Figure 9:
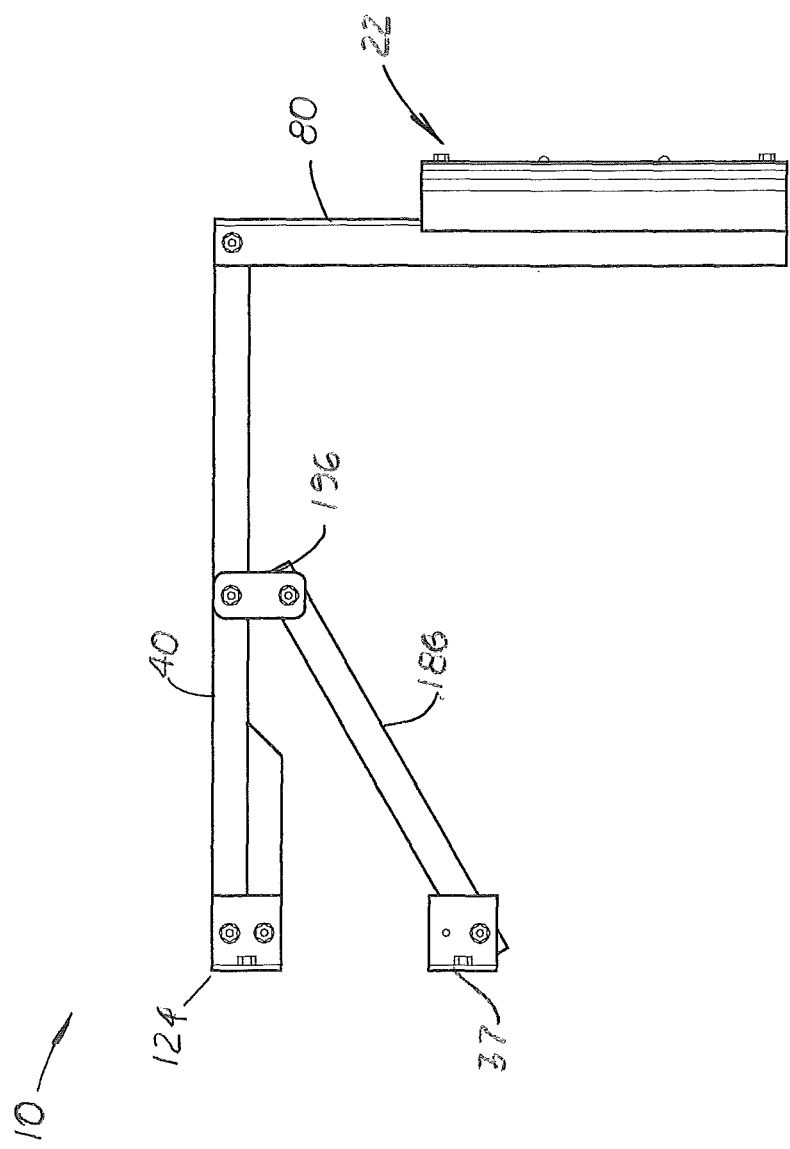
FIG. 9 is a side elevation view of the side guard assembly.

Attached to the inner frame 20 are two upward extending support members 80, 100. Each support member 80, 100 include two t-shaped threaded connectors 81 that extend through the slots 23, 33 formed on the tube members 22, 32, respectively, to securely attach the support members 80, 100 to the side member 20. During installation, the t-shaped connectors 81 may be loosened enabling the user to move the side member 20 longitudinally in fore or aft directions as shown in FIG. 5.

The upper proximal end of each support member 80, 100 is pivotally attached to the distal end of a horizontal member 40, 60, respectively, and extends laterally from the vehicle frame 230. Attached to the proximal end of each horizontal member 40, 60 is an upper, u-shaped inner mounting bracket, 124, 144, respectively, that attaches to the outside surface of the vehicle's frame 230. Attached to the vehicle frame 230 and below each upper mounting bracket 124, 144 is an inner lower mounting bracket 160, 180, respectively. Pivotally attached to each inner lower mounting bracket 160, 180 is a diagonal member 186, 192, respectively, that extends upward and pivotally attaches to a u-shaped, intermediate slide bracket 196, 198, respectively. The slide brackets 196, 198 may slide inward and outward over the horizontal member 40, 60. During use, the slide brackets 196, 198 may be selectively moved longitudinally inward or outward over the horizontal members 40, 60 and then tightened to the desired location. By moving the slide brackets 196, 198 to different locations on the horizontal members 40, 60, respectively, the angle or slope of the horizontal members 40, 60 may be adjusted upward or downward. Because the distal end of each horizontal member 40 and 60 is pivotally amounted to the two upward extending support members 80, 100, respectively, the member 20 may move upward and. Also, because the proximal and distal ends of the horizontal members 40, 60 pivot, the planar surface of the side plate 36 may be vertical or diagonally aligned to accommodate different structures or objects in the void space 160.

The side member 20 is approximately forty-eight inches in length and twelve inches in height and made of steel or similar rigid material sufficiently durable to withstand impacts by objects moving into the void space 160. The inner frame 22 is made of 1 inch steel or aluminum tubing square in cross-section. The horizontal members 40, 60, and diagonal members 186, 192 are also made of 1 inch steel or aluminum tubing square in crossing section. The length of each horizontal member 40, 60 is 6 to 30 inches. In the preferred embodiment, the horizontal members 40, 60 are sufficient in length so that the outside surface of the side plate 36 is flush or even with the outside surface of the truck cab, bed or trailer when attached to the support member 80, 100.

When installing the side guard assembly 10, the installer reviews the size and shape of the void space 160 and the mounting surfaces on the vehicle frame 230 for suitable flat mounting surfaces for the two pairs of upper and lower mounting brackets 124, 144, 160, 180, respectively. The upper and lower mounting brackets 124, 144, 160, 180 are then attached to the vehicle frame 230. The horizontal members 40, 60 and diagonal members 186, 192 are then attached the mounting brackets 124, 144 and 160, 180, respectively. The slide bracket 196, 198 may be moved longitudinally inward or outward over the horizontal member 40, 60, respectively, to change the angle of the side plate 36 and to accommodate different objects and structures. The side plate 36 may then be moved in fore and aft directions on the angle members 80, 100.

Figure 10:
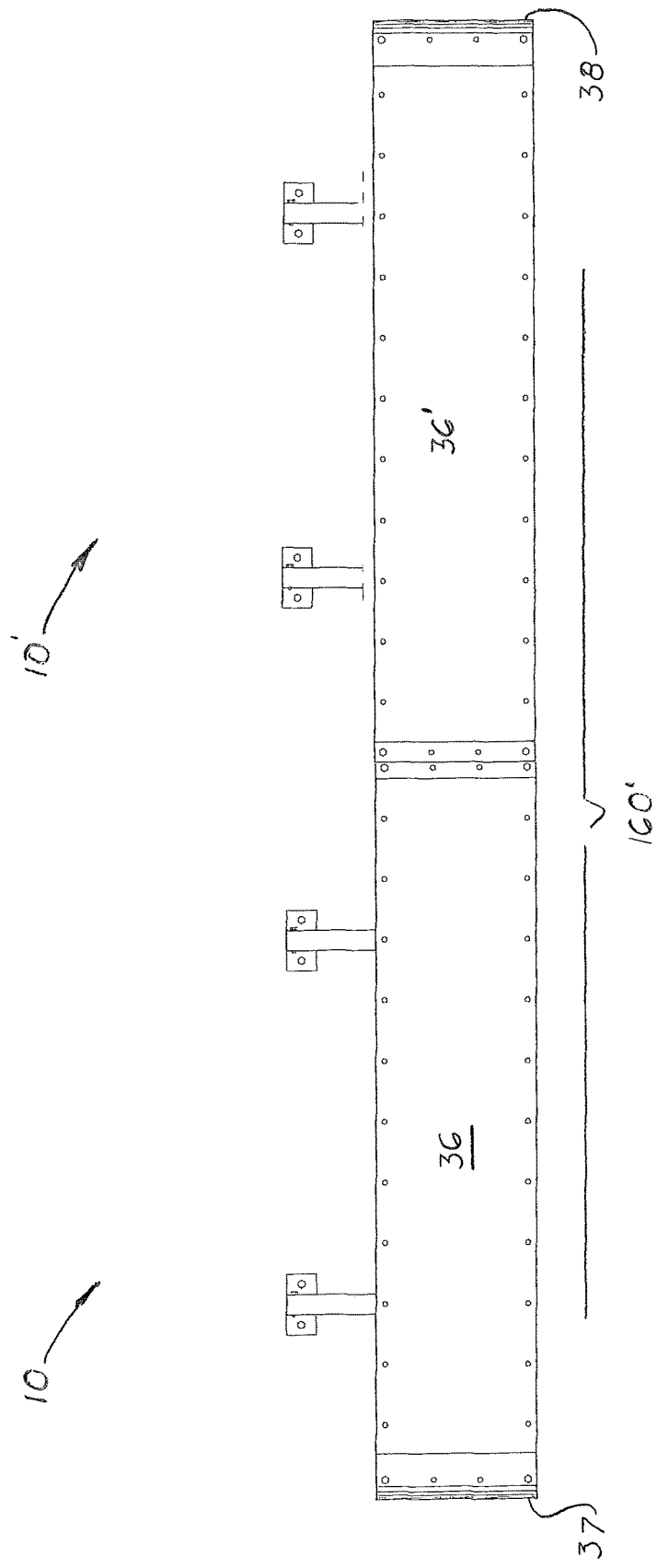
FIG. 10 is a front elevational view of two side guard plates longitudinally aligned and attached to a vehicle frame.

Sometimes the void area 160 is longer than the length of a single side guard assembly 10. As shown in FIG. 10, two side guard plate assemblies 10, 10' may be longitudinally aligned and attached in an end-to-end manner and then attached to a vehicle frame 230 to cover the longer void area 160'.

In compliance with the statute, the invention described has been described in language more or less specific as to structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted the doctrine of equivalents.

We claim:

1. An adjustable side guard assembly that selectively attaches to a frame on a motor vehicle that has an inner frame and a bed or a trailer with a void space under the bed or trailer, said assembly comprising:

a. an elongated side member configured to fit inside the void space and prevent objects from entering the void space, the side member includes a rigid inner frame that includes at least two longitudinal members, each longitudinally member includes an outer side surface and an inside surface, an elongated slot formed on the inside surface of each longitudinal member, the elongated side member also includes at least one side plate attached to the inner frame;

b. at least two support members attached to the inner frame, the support members being perpendicularly aligned with the longitudinal members on the inner frame, each support member includes at least two slide connectors that slides along the slots formed on the longitudinal members and selectively tighten to affixed the support members at different locations on the inner frame;

c. at least two horizontal members each with a proximal end and a distal end, the distal end of each horizontal member being pivotally attached to the upper end of one support member;

d. an upper bracket affixed to the vehicle frame and pivotally attached to the proximal end of each horizontal member; and e. whereby when the upper brackets are attached to the vehicle frame and the horizontal members are attached to the upper brackets and to the support members, the inner frame may be longitudinally adjusted inside the void space to provide optimal protection against objects entering the void area.

2. The adjustable side guard assembly, as recited in claim 1 wherein side member is approximately 36 to 60 inches in length.

3. The adjustable side guard assembly, as recited in Claim 1, further including a diagonal member attached to each horizontal member configured to support the horizontal member.

4. The adjustable side guard assembly, as recited in Claim 3, wherein said diagonal member is attached to a lower bracket mounted on the vehicle frame.

5. The adjustable side guard assembly, as recited in Claim 3, further including a slide bracket attached to each horizontal member and to said diagonal member, each slide bracket configured to selectively slide along the horizontal member and then securely attached to the horizontal member at a desired fixed location.

6. The adjustable side guard assembly, as recited in Claim 1, further including end caps attached to opposite ends on the side member.

7. The adjustable side guard assembly, as recited in Claim 1, wherein each support member is an L shaped bar.

* * * * *